(12) United States Patent
Riemann (10) Patent No.: US 10,875,123 B2
(45) Date of Patent: Dec. 29, 2020

(54) LASER METAL DEPOSITION HEAD

(71) Applicant: FORMALLOY, LLC, Spring Valley, CA (US)

(72) Inventor: Jeffrey L. Riemann, Spring Valley, CA (US)

(73) Assignee: Formalloy Technologies, Inc., Spring Valley, CA (US)

( * ) Notice: Subject to any disclaimer, the term of this patent is extended or adjusted under 35 U.S.C. 154(b) by 262 days.

(21) Appl. No.: 16/058,840

(22) Filed: Aug. 8, 2018

(65) Prior Publication Data

US 2019/0047088 A1 Feb. 14, 2019

Related U.S. Application Data

(60) Provisional application No. 62/543,268, filed on Aug. 9, 2017.

(51) Int. Cl.
| | |
|---|---|
| *B23K 26/342* | (2014.01) |
| *B23K 26/14* | (2014.01) |
| *B33Y 30/00* | (2015.01) |
| *B23K 26/70* | (2014.01) |
| *B22F 3/105* | (2006.01) |

(52) U.S. Cl.
CPC ........... *B23K 26/342* (2015.10); *B23K 26/14* (2013.01); *B23K 26/1464* (2013.01); *B23K 26/1482* (2013.01); *B23K 26/703* (2015.10); *B33Y 30/00* (2014.12); *B22F 3/1055* (2013.01); *B22F 2003/1056* (2013.01)

(58) Field of Classification Search
CPC .................................................. B23K 26/144
See application file for complete search history.

(56) References Cited

U.S. PATENT DOCUMENTS

| | | | | |
|---|---|---|---|---|
| 3,739,140 A | * | 6/1973 | Rotilio | B23K 9/28 219/144 |
| 5,321,228 A | * | 6/1994 | Krause | B05B 7/228 219/121.64 |
| 5,418,350 A | * | 5/1995 | Freneaux | B05B 7/228 219/121.64 |
| 5,477,026 A | | 12/1995 | Buongiorno | |
| 6,534,745 B1 | * | 3/2003 | Lowney | B23K 26/1482 219/121.84 |
| 2005/0056628 A1 | | 3/2005 | Hu | |
| 2007/0193981 A1 | * | 8/2007 | Peng | B23K 26/144 219/121.33 |
| 2008/0308538 A1 | | 12/2008 | Harris et al. | |

(Continued)

FOREIGN PATENT DOCUMENTS

JP  11000775 A  1/1999

*Primary Examiner* — Ibramime A Abraham
*Assistant Examiner* — John J Norton
(74) *Attorney, Agent, or Firm* — Patterson + Sheridan LLP (57) ABSTRACT

Aspects of the present disclosure relate to improved laser metal deposition heads. Various embodiments may include a main body, a nozzle seat, a powder flow guide, an inner nozzle, an outer nozzle, and a coolant sleeve. In some embodiments, powder inlets in the main body are angled relative to a primary axis of the laser metal deposition head. In some embodiments, the nozzle seat includes a plurality of powder distribution channels that are also angled relative to the primary axis of the laser metal deposition head.

20 Claims, 10 Drawing Sheets

(56) References Cited

U.S. PATENT DOCUMENTS

| | | | | |
|---|---|---|---|---|
| 2009/0057278 A1* | 3/2009 | Nowotny | ............. | B23K 26/342 |
| | | | | 219/121.63 |
| 2011/0089151 A1* | 4/2011 | Miyagi | ................ | B23K 26/147 |
| | | | | 219/121.66 |
| 2012/0199564 A1* | 8/2012 | Washko, Jr. | ........... | B23K 26/34 |
| | | | | 219/121.63 |
| 2013/0319325 A1 | 12/2013 | Whitfield et al. | | |

* cited by examiner

LASER METAL DEPOSITION HEAD

CROSS-REFERENCE TO RELATED APPLICATION

This application claims the benefit of U.S. Provisional Patent Application No. 62/543,268, filed on Aug. 9, 2017, the disclosure of which is incorporated herein by reference in its entirety.

INTRODUCTION

Aspects of the present disclosure relate to improved laser metal deposition heads. Laser metal deposition (LMD), sometimes alternatively referred to as laser deposition welding, is a laser-based additive manufacturing process in which metal structures are built up on a substrate or metal layers and structures are applied to existing components (e.g., cladding) in layers. In LMD, a laser generates a molten bath on an existing surface into which metal powder is directed through a nozzle in a deposition head (e.g., using a carrier gas). The powder melts and bonds with the base material in the molten pool thereby forming new layers and ultimately structures additively.

A key component of any LMD machine is the LMD head. In general, the LMD head includes a channel for a transiting laser beam, channels for directing gas carrying powder, and channels for directing shield gas, among other components. Existing LMD head designs suffer from many design shortcomings.

For example, conventional LMD head designs are often difficult to maintain, requiring time-intensive disassembly to clean out powder and to change out nozzles. Further, existing designs tend to be too large in diameter to access tight spaces, especially due to inlet and outlet hoses protruding from the body of the LMD head. Such diameters are typically greater than 100 mm when accounting for the protrusion of the hoses, which may limit precision of builds due to the access limitations of a large LMD head. Further, the large diameter and protrusions create susceptibility to laser reflections, which may damage the powder, gas, coolant delivery lines, and other parts of the LMD head.

As another example, conventional LMD head designs inefficiently deliver powder to the laser melt pool. For example, LMD heads with independent powder-stream nozzles, such as those with three or more independent powder streams, typically cannot focus the powder into the laser spot as precisely or efficiently as a coaxial-type nozzle. In some cases, the delivery rate may be less than 50%, which leads to wasted material and difficulty in controlling the deposition quality.

As yet another example, conventional LMD heads are generally not configured for easy nozzle changes. Because the nozzle may determine the powder focus (which should correspond to a laser spot size), it may be necessary to change nozzles frequently to alter the powder focus and thereby the processing size.

Finally, existing designs do not allow for customization of auxiliary shield gas flows.

Accordingly, there is a need for improved LMD head designs, which address the aforementioned design deficiencies.

BRIEF SUMMARY

Certain embodiments provide a laser metal deposition head, including: a main body, comprising: a plurality of powder inlets; a plurality of powder flow channels; a shield gas inlet; an auxiliary gas inlet; and a nozzle seat, including: a shield gas channel; an auxiliary gas channel; and a plurality of powder distribution channels; and an inner nozzle connected to the nozzle seat; an outer nozzle connected to the nozzle seat, wherein the outer nozzle and inner nozzle form a conical powder outlet channel therebetween; a powder flow guide disposed within the nozzle seat, wherein the powder flow guide and the nozzle seat are arranged to form a powder mixing chamber therebetween; and a coolant sleeve comprising an inner surface in contact with an outer surface of the outer nozzle.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide improved laser metal deposition (LMD) assemblies, such as LMD heads or "deposition heads".

Powder nozzles come in various designs. For example, in a coaxial powder nozzle, the powder flows directly into the laser beam assisted and protected by a carrier gas, which may be an inert gas, such as argon, nitrogen, helium, or a blend of such gases. In some cases, the powder flows through a conically shaped outlet with an annular gap, while in others the powder flows through multiple outlets. A conically shaped nozzle may be constructed by a coaxially mounted inner and outer cone creating a defined offset between the two. In case of multiple outlets, the powder flows through channels inside the nozzle. An off-axis powder nozzle, by contrast, feeds the powder in a lateral position to the laser beam.

The relative movement of a deposition head and work piece may be performed, for example, by a multi-axis robot or gantry system. There are a variety of ways to control the relative positioning of the work piece and the deposition head. For example, the substrate and the deposition head may move simultaneously or the substrate moves and tilts while the deposition head holds at a fixed position or moves in only one dimension.

An improved deposition head that addresses the issues with conventional designs may include one or more of the following features.

First, the improved deposition head may include inlets and outlets (e.g., for powder, coolant, gases, etc.) positioned within the outer diameter of the body and facing downward (i.e., in the same general direction as the powder nozzle outlet). In some cases, the powder inlets may be at an acute angle with respect to the primary axis/laser axis. For example, the powder inlets may be within +/−65 degrees of the primary axis/laser axis (or any particular sub-range within that range, such as 15-50 degrees). This configuration of inlets and outlets protects against laser reflections, which may damage the hoses or lines leading to the inlets and from the outlets, as well as anything travelling in them (such as powder). Further, this configuration of inlets minimizes the diameter of the deposition head so that it may be used in tighter spaces. In particular, this configuration provides for a relatively smaller deposition head for a given laser power level as compared to conventional designs.

In one embodiment, an improved deposition head includes four angled powder inlets, one shield gas inlet, one auxiliary gas inlet (e.g., for shield gas or cooling gas), one coolant inlet, and one coolant outlet. The deposition head may also include an auxiliary gas outlet that enables customizable gas flows through use of various auxiliary gas nozzles.

Second, the improved deposition head may include helical powder channels within the body of the deposition head, which provide improved (e.g., more even) distribution of the powder supply to powder distribution channels. In particular, the helical powder channels impart lateral velocity into the powder, which improves the distribution of powder across the powder distribution channels. Further, the helical powder channels may increase the laminar (i.e., smooth) flow throughout the powder flow circuit within the deposition head. The laminar flow reduces the chances of turbulence, such as eddies, which may lead to unpredictable powder delivery rates and thus lower quality deposition. Such a powder flow circuit design results in two-phase (i.e., gas and powder) flow that nearly matches the flow of single phase (gas only) flow through the deposition head.

Third, the improved deposition head may include angled powder distribution channels (i.e., angled relative to the primary axis/laser axis) to reduce outer nozzle wear. Angling the powder distribution channels towards the laser spot/melt pool along their extent, may beneficially reduce the angle of impact of the powder exiting the powder distribution channels on the outer nozzle. In addition to reducing the wear on the nozzle, there is less turbulence created by the powder flow "bouncing" between outer and inner nozzles. The sharper angles in conventional deposition head designs leads to wear on the nozzles because the angle of impact with the nozzle is more severe, in much the same way that sandblasting removes material.

Fourth, the improved deposition head may include a clamping mechanism for ease of assembly, maintenance, and modular nozzle changes. In some embodiments, the clamping mechanism is one of a mechanical, electromechanical, pneumatic, hydraulic or magnetic mechanism. The clamping element coupled with a modular nozzle design reduces the parts required to change nozzle sizes and styles and enables automated nozzle changes (e.g., controlled by electronic machinery and not humans).

Fifth, the improved deposition head may include an adjustable axial hard-stop for ease of adjustability and reassembly. Because the deposition head sets the powder focus independently of optics that set the laser focus, and which in some examples are not in the deposition head, it is necessary to adjust the axial position of the deposition head so that the powder focus and laser focus converge. This ensures efficient processing of powder. Further, as discussed above, it may be desirable to remove a deposition head for maintenance or to change between deposition heads. The hard-stop ensures that each time the deposition head is attached to the additive manufacturing machine, it returns to a precise axial location that guarantees a precise powder focus.

Sixth, the improved deposition head may include external (i.e., external to the powder flow) cooling elements that further enhance cooling and eliminate the possibility of powder-coolant contamination as the coolant flows externally around the nozzle while the powder flows internally to the nozzle. For example, the deposition head may include a coolant sleeve with internal liquid coolant channels that remove heat from an outer nozzle of the deposition head.

Seventh, the improved deposition head may include an auxiliary gas nozzle that directs auxiliary gas (e.g., a cooling gas) towards a processing area. The auxiliary gas nozzle may be modular so that different auxiliary gas flows are achievable with the same deposition nozzle.

Eighth, the improved deposition head may be constructed from materials with relatively high thermal conductivity, such as copper-based alloys, which makes the deposition head more robust to the high temperature environment near the melt pool. In some embodiments, such as for low mass and low power applications, aluminum may be a suitable alternative.

Notably, the aforementioned features are only some of the improvements that are evident from the remaining disclosure herein.

Example Improved Laser Metal Deposition (LMD) Assembly

Figure 1:
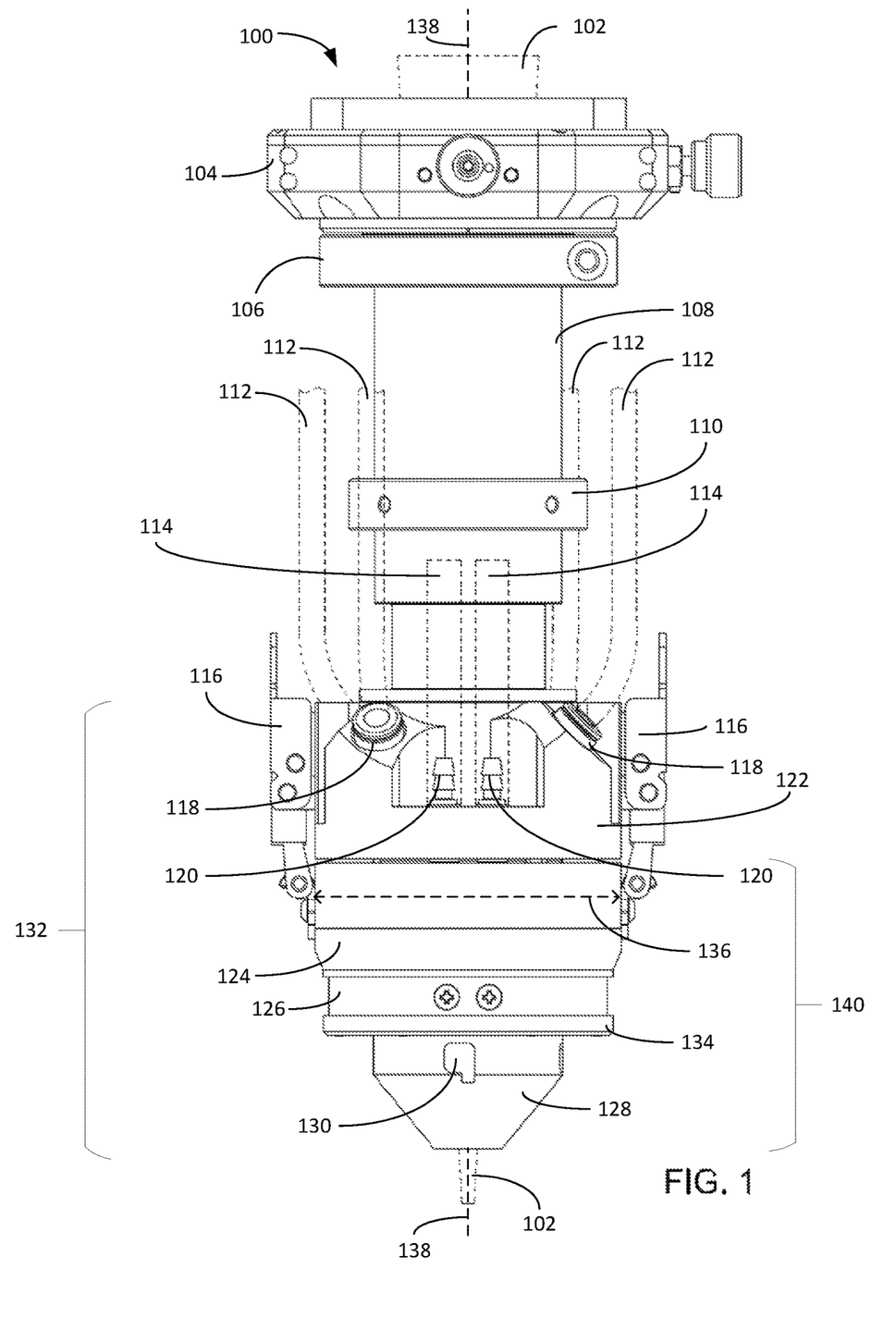
FIG. 1 depicts an example laser metal deposition (LMD) assembly.

FIG. 1 depicts a view of an improved laser metal deposition (LMD) assembly 100 including an improved LMD deposition head 132.

Deposition head 132 includes powder inlets 118, which in this embodiment enter main body 122 both within lateral extent 136 of main body 122 and at an approximately 45 degree angle relative to the primary axis/laser axis 138 of deposition assembly 100. In other embodiments, the angle may be another acute angle relative to the primary axis/laser axis 138, such as an angle within the range of +/−65 degrees of the primary axis/laser axis 138.

The arrangement of the powder inlets 118 inboard of lateral extent 136 of main body 122 allows for a smaller overall lateral extent, which allows deposition assembly 100 to be usable in smaller spaces. Thus, deposition head 132 is more versatile compared to less compact, conventional designs. Further, angled powder inlets 118 reduce the angle of the turn necessary for powder hoses 112 to turn parallel with the primary axis 138 after exiting powder inlets 118. This arrangement allows the connection of powder hoses 112 with minimal if any protrusion from lateral extent 136 of deposition head 132. As described above, this greatly reduces the chance of a laser reflection damaging the powder hoses 112 or their content. Further, the arrangement of the powder inlets 118 at an angle relative to the primary axis 138 induces a lateral velocity in the powder flow, which contributes to better distribution of powder across the powder distribution channels (not depicted in FIG. 1) in deposition head 132.

Though not depicted in FIG. 1, main body 122 includes powder flow channels that connect between powder inlets 118 and a powder flow guide disposed within nozzle seat 124 (which is discussed in more detail below). In some embodiments, these main body powder flow channels are helical, while in others they maintain the same or a similar angle as the entry angle of the powder inlets 118 while traversing main body 122 towards the powder flow guide.

In other embodiments, powder inlets 118 may be substantially parallel to primary axis/laser axis 138, but lead to powder flow channels within main body 122 which are angled or bent (e.g. helical) relative to primary axis/laser axis 138. In such cases, while the inlet itself would not impart lateral velocity, the powder flow channels within main body 122 would still create the lateral velocity.

Deposition head 132 includes coolant inlet and outlet 120 in main body portion 122. In this embodiment, either may serve as the inlet and the other the outlet. As with the powder inlets 118, the coolant inlet and outlet 120 are within lateral extent 136 of deposition head 132, and in particular within a volume recessed into deposition head 132 and between powder inlets 118. As above, this placement helps to shield the coolant lines 114 from any damaging laser reflections and also reduces the overall lateral extent of LMD assembly 100. Note that in this embodiment, coolant inlet and outlet 120 comprise quick hose connection barbs. In other embodiments, other sorts of connection points may be used to connect with coolant lines 114.

Though not depicted in FIG. 1, on the opposite side of main body 122, two more inlets are installed in a substantially similar location (i.e., inboard of lateral extent 136 of deposition head 132 and within a volume recessed into main body 122. In some embodiments, these additional inlets can be used for shield gas and for cooling gas. Shield gas is normally used to shield the melt pool and ensure no foreign artifacts or corrosion occurs. The cooling gas can be used to help cool the area around the melt pool to avoid deformities in the part being manufactured.

The main body 122 of deposition head 132 is connected to a lower body portion 124, which may also be referred to as nozzle seat 124 via clamping mechanisms 116. In this embodiment, the clamping mechanisms 116 are manual, mechanical clamps that serve to fix together main body 122 and nozzle seat 124. Clamping mechanisms 116 ease the changing of parts, such as nozzle assembly 140, which makes maintenance and modular part changes efficient. In other embodiments, clamping mechanisms 116 may be electromechanical, pneumatic, hydraulic or magnetic clamping mechanisms, which may allow for automated changing of nozzle assemblies, such as nozzle assembly 140.

Nozzle seat 124 is connected to a coolant sleeve 126, which provides for cooling of elements of nozzle assembly 140, such as outer nozzle 128 and an inner nozzle (which is not depicted in FIG. 1).

Coolant sleeve 126 is connected to auxiliary gas cap 134. In some embodiments, auxiliary gas cap 134 prevents additional gas flows from exiting gas flow channels within nozzle assembly 140 (not depicted in FIG. 1). Further, auxiliary gas cap 134 can protect internal O-rings (not depicted in FIG. 1) that interface between outer nozzle 128 and coolant sleeve 126 from damage (e.g., from laser reflections or manufacturing process debris).

Outer nozzle 128 is one of two coaxial nozzles that direct powder flow towards a focal point of laser 102. Outer nozzle 128 includes outer nozzle tool channel 130, which allows for a tool to rotate outer nozzle 128 in order to install or uninstall outer nozzle 128.

Deposition head 132 is connected to extension tube 108, which includes axial hard stop 110. Extension tube 108 allows for proper axial location of deposition head 132 based on the focal point of laser 102, which is set by optics outside of LMD assembly 100. In other embodiments, extension tubes of different lengths can be installed to work with different optics setups.

Axial hard stop 110 is affixed to extension tube 108, for example, via a clamping force, but is movable to different locations along extension tube 108. As explained above, axial hard stop 110 can be moved to a specific location and locked into place so that a specific height of deposition head 132 relative to other aspects of an LMD machine (e.g., the deposition head articulation equipment) can be set easily and reliable each time LMD assembly 100 is installed. Once installed, axial hard stop 110 will interface with axial adjustment clamp 106, which clamps around extension tube 108 to hold LMD assembly 100 to other aspects of an LMD machine, such as an automated or otherwise controllable deposition head positioning system. In this way, the deposition head 132 can easily be moved and can be reliable reinstalled in an exact location such that the powder focal point set by nozzle assembly 140 corresponds with the laser focal point set by optics that are external to LMD assembly 100. Note that in FIG. 1, axial hard stop 110 is shown separated from axial adjustment clamp 106 in order to demonstrate its movable nature. When in use, axial hard stop 110 would abut axial adjustment clamp 106.

In other embodiments, positioning of LMD assembly 100 may be accomplished by other attachment mechanisms other than axial adjustment clamp 106. For example, extension tube 108 may include threaded connections to other portions of the LMD machine. As yet another example, a rack and pinion mechanism, or set screw could provide axial adjustment of LMD assembly 100. The depicted example is just one attachment mechanism, and others are possible.

Also depicted in FIG. 1 is a X-Y adjustment stage 104. The adjustment stage allows adjustment in the X and Y dimensions so that a powder cone being deposited from nozzle assembly 140 is perfectly aligned with a focal point of laser beam 102. In other embodiments, such adjustment may be performed via optical elements (not depicted) that affect the laser beam focal point.

Figure 2:
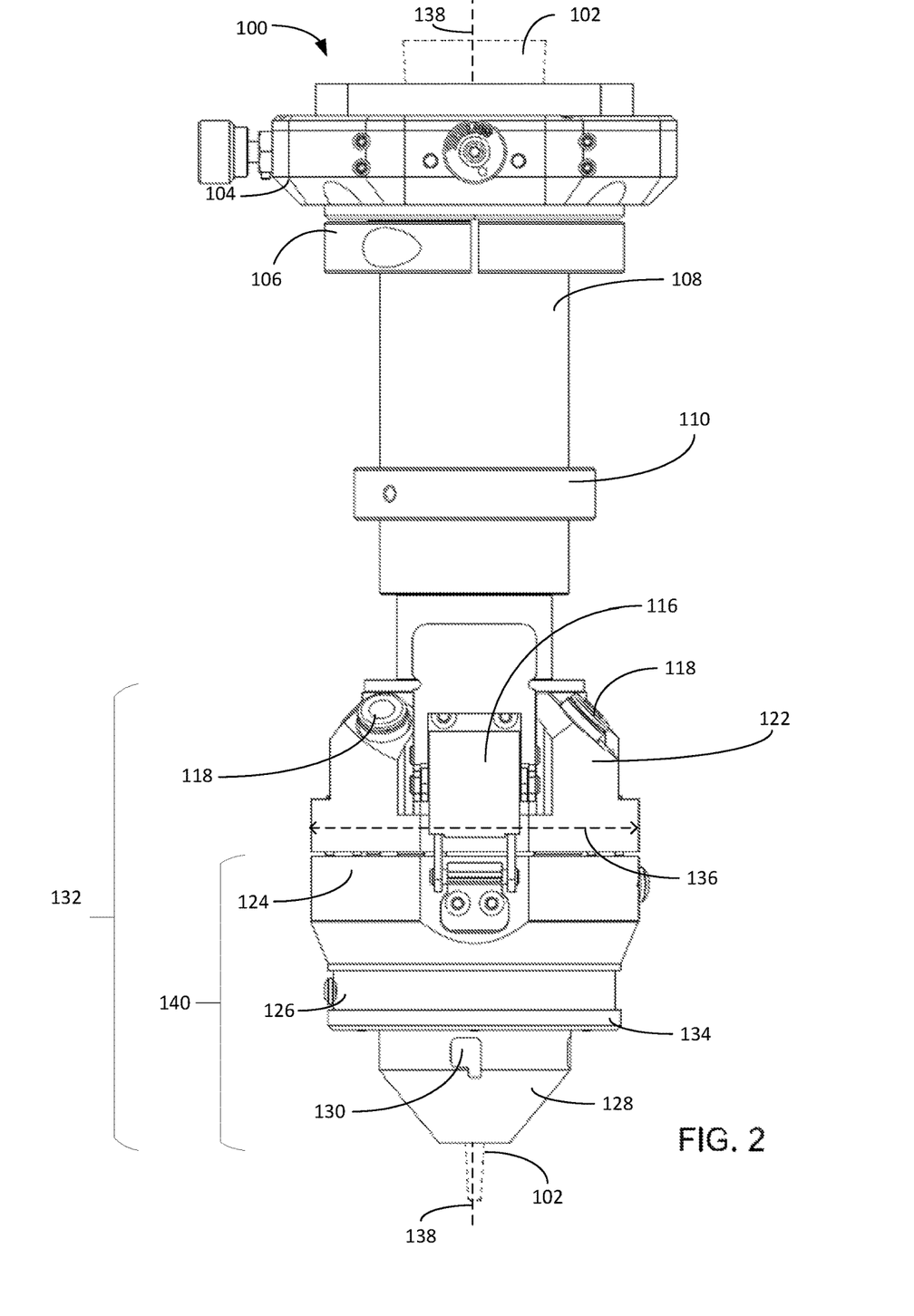
FIG. 2 depicts a ninety degrees rotated view of the LMD assembly depicted in FIG. 1

FIG. 2 depicts a ninety degrees rotated view (around primary axis 138) of LMD assembly 100 as depicted and described with respect to FIG. 1. From this angle, it is clear that the coolant inlet and outlet 120 and the shield gas and cooling gas inlets are recessed within lateral extent 136 of main body 122. Based on this placement, coolant inlet and outlet 120 and the shield gas and cooling gas inlets are completely protected from laser reflections, debris, etc.

Note that in FIG. 2, the various hoses leading to the various inlets and outlets are omitted.

Figure 3:
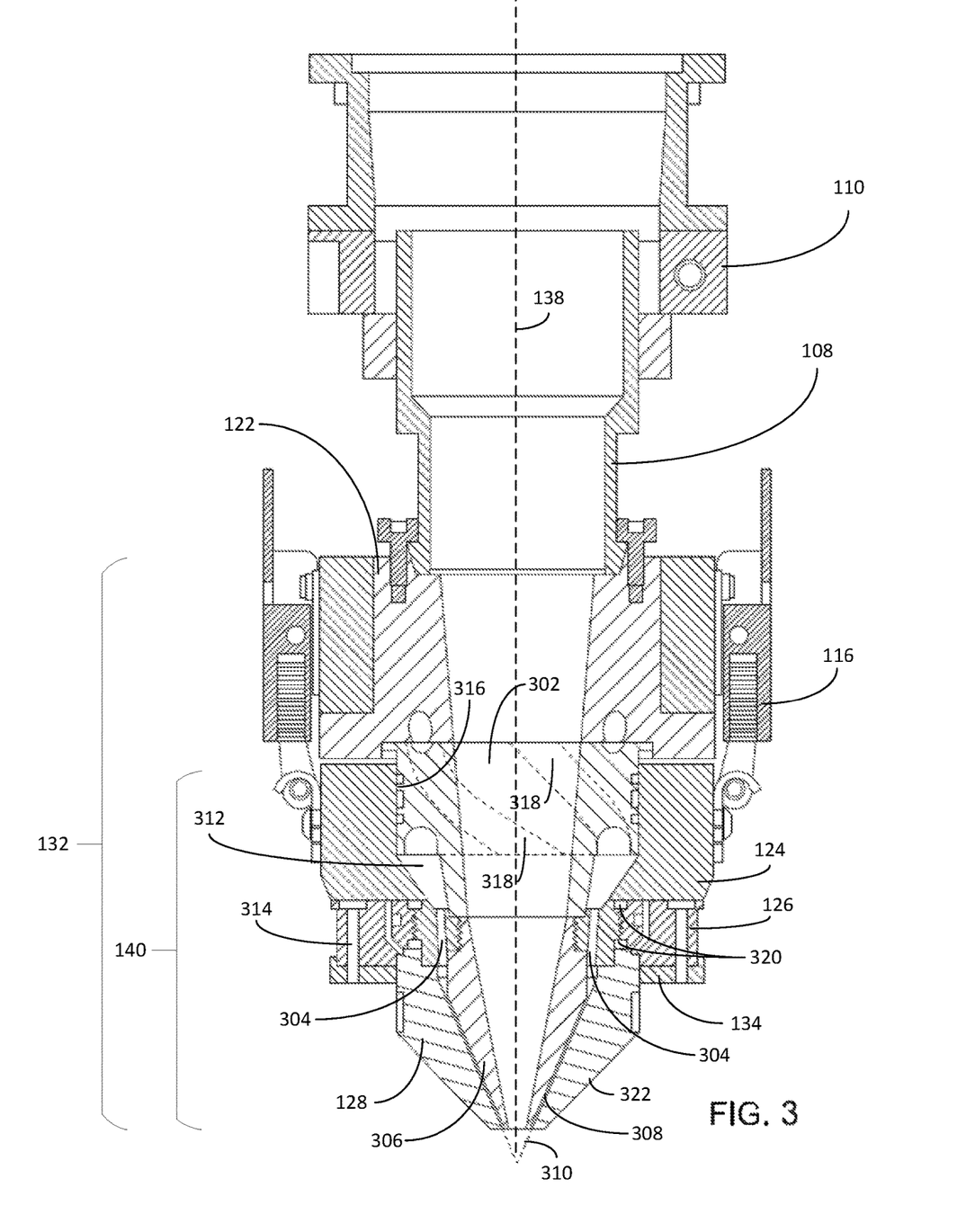
FIG. 3 depicts a cross-sectional view of aspects of the LMD assembly depicted in FIG. 1.

FIG. 3 depicts a cross-sectional view of aspects of LMD assembly 100 from FIGS. 1 and 2. Nozzle assembly 140 in FIG. 3 includes powder flow guide 302, which includes helical powder flow channels 318 (depicted with broken lines). Helical powder flow channels 318 maintain the lateral velocity of the powder flow after entering the powder flow inlets (not depicted in FIG. 3) in main body 122. Helical powder flow channels 318 lead to a powder mixing chamber 312 (or volume or channel) where the powder flows converge into a contiguous volume before feeding into angled powder distribution channels 304. Powder flow guide 302 also includes a plurality of O-ring channels 316 or grooves for sealing with nozzle seat 124.

As depicted and described with respect to FIGS. 1 and 2, deposition head 132 may include a plurality of powder inlets, which then lead to helical powder flow channels 318 and then to powder mixing chamber 312. In some cases, all powder inlets receive the same type of powder material, in which case helical powder flow channels 318 and powder mixing chamber 312 ensure even distribution of powder in the carrier gas flow so that the volume of powder delivered to powder cone 310 (and ultimately to the melt pool) is steady and consistent. When the powder inlets receive different powder materials, helical powder flow channels 318 and powder mixing chamber 312 further ensure even distribution and good mixing of the different materials prior to being delivered to powder cone 310 (and ultimately to the melt pool). Maintaining the lateral velocity of the powder flows into powder mixing chamber 312 substantially improves distribution consistency and mixing as compared to designs that have linear (i.e., relatively straight) flows of powder from entry into the deposition head to outlet from the deposition head.

After powder flows into mixing chamber 312 via carrier gas, the powder then flows into powder distribution channels 304. Again, the lateral velocity of the powder in mixing chamber 312 ensures an even distribution of powder to the plurality of powder distribution channels 304.

In this embodiment, powder distribution channels 304 are angled relative to the primary axis/laser axis 138. In this example, the angling is slight and in other embodiments the angling may be more significant. The angle of powder distribution channels 304 presents the powder flow to the conically shaped powder outlet channel 308 (formed between inner nozzle 306 and outer nozzle 128) at a less severe angle than if the powder distribution channels 304 were parallel to primary axis 138. In this way, the powder flow is less abrasive to outer nozzle 128 as it exits the angled powder distribution channels 304.

Inner nozzle 306 is coaxial with outer nozzle 128. Notably, the conical powder outlet channel 308 formed between inner nozzle 306 and outer nozzle 128 directs powder into a powder cone 310 for processing. In this embodiment, the angle of conical powder outlet channel 308 relative to primary axis 138 is different than the angle of the outer, angled surface 322 of outer nozzle 128 with respect to primary axis 138.

Outer nozzle 128 includes O-ring channels 320 for seating outer nozzle 128 against coolant sleeve 126. The physical interface (i.e., contact) between coolant sleeve and outer nozzle 128 allows for heat transfer away from outer nozzle 128, which is subject to the most heat from the laser metal deposition process (both in ambient heating and laser reflections). In some embodiments, outer nozzle 128 is made of highly conductive materials (e.g., copper or aluminum alloys) so that even the small surface area interface between coolant sleeve 126 and outer nozzle 128 allows for effective heat transfer away from outer nozzle 128 with a relatively compact coolant sleeve 126.

FIG. 3 also shows auxiliary gas cap 134 connected to coolant sleeve 126 via connecting members 315. Connecting members could be, for example, screws, dowels, or other known mechanical connecting means.

Figure 4:
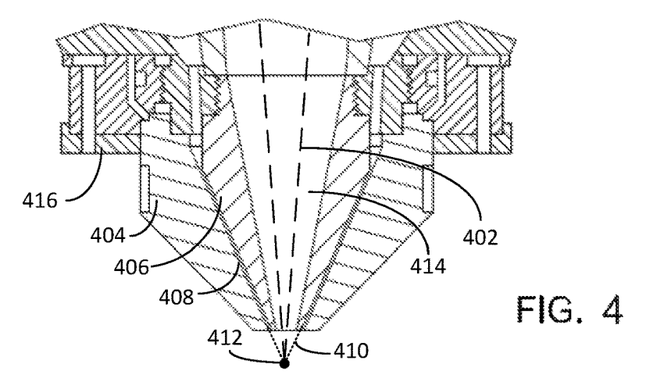
FIG. 4 depicts a portion of a nozzle assembly.

FIG. 4 depicts a portion of a nozzle assembly, such as described with respect to FIGS. 1-3. The depicted portion of the nozzle assembly includes an inner nozzle 406 mounted coaxially with outer nozzle 404, thereby forming a conical powder channel 408. Powder flowing through the conical powder channel 408 (e.g., in a carrier gas) exits through an annular gap and forms a powder cone 410 which converges at a powder focal point in melt pool 412. Laser beam 402 similarly converges at a focal point in melt pool 412.

In this embodiment, shield gas flows through the laser beam channel 414 towards melt pool 412. However, due to the installation of auxiliary gas cap 416, no auxiliary gas (e.g., shield gas or cooling gas) is directed towards melt pool 412 other than the carrier gas carrying the powder through conical powder channel 408 and the shield gas flowing through laser beam channel 414.

Figure 5:
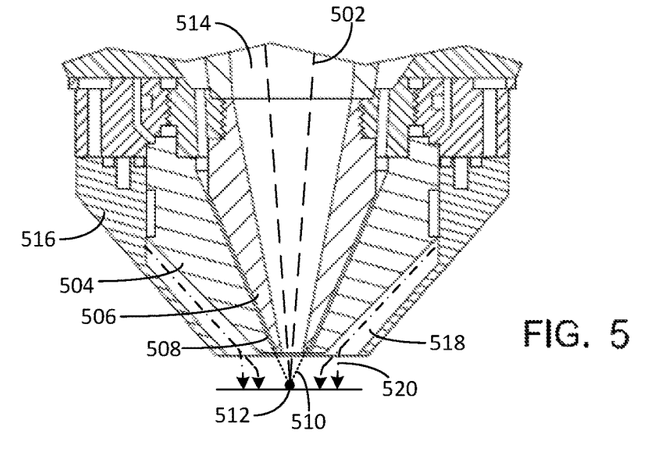
FIG. 5 depicts a portion of a nozzle assembly with an auxiliary gas nozzle.

FIG. 5 depicts a portion of a nozzle assembly with an auxiliary gas nozzle 516. Like in FIG. 4, the depicted portion of the nozzle assembly includes an inner nozzle 506 mounted coaxially with outer nozzle 504, thereby forming a conical powder channel 508. Powder flowing through the conical powder channel 508 exits through an annular gap and forms a powder cone 510 which converges at a powder focal point in melt pool 512. Laser beam 502 similarly converges at a focal point in melt pool 512.

Like in FIG. 4, shield gas flows through the laser beam channel 514 towards melt pool 512. Additionally an auxiliary gas flow 520, such as shield gas or cooling gas, is directed towards melt pool 512. In this embodiment, the auxiliary gas channel 518 is formed between outer nozzle 504 and a coaxially mounted auxiliary gas nozzle 516, which may be affixed to the coolant sleeve instead of an auxiliary gas cap (such as auxiliary gas cap 134 in FIG. 1). In this example, the auxiliary gas flow 520 is narrowly "focused" to direct the auxiliary gas 520 around a periphery of melt pool 512. For example, the auxiliary gas 520 may strike the part being manufactured in a concentric circular pattern around, but not within melt pool 512. As depicted, the auxiliary gas 520 flow may "bend" as it leaves the auxiliary gas channel 518 and becomes influenced by other flows, such as the shield gas flow, convective flows from the melt pool, etc. The auxiliary gas flow 520 may be used to further shield the melt pool 512 or to actively cool the part being manufactured, or both. Importantly, the rate and temperature of the auxiliary gas flow 520 may be controlled independently from the carrier gas flow through conical powder channel 508 and the shield gas flow through laser channel 514.

Figure 6:
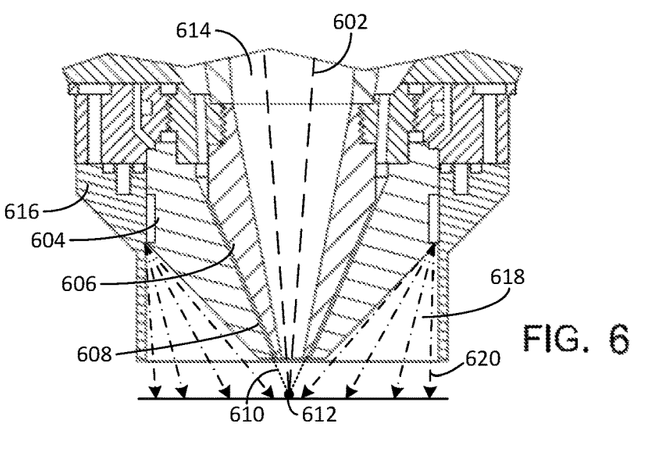
FIG. 6 depicts a portion of a nozzle assembly with another auxiliary gas nozzle.

FIG. 6 depicts a portion of a nozzle assembly with another auxiliary gas nozzle 616. Like in FIGS. 4 and 5, the depicted portion of the nozzle assembly includes an inner nozzle 606 mounted coaxially with outer nozzle 604, thereby forming a conical powder channel 608. As above, powder flowing through the conical powder channel 608 exits through an annular gap and forms a powder cone 610 which converges at a powder focal point in melt pool 612. Laser beam 602 similarly converges at a focal point in melt pool 612.

Like in FIGS. 4 and 5, shield gas flows through the laser beam channel 614 towards melt pool 612. Additionally, like in FIG. 5, an auxiliary gas flow 620, such as shield gas or cooling gas, is directed around melt pool 612. In this embodiment, the auxiliary gas channel 618 is formed between outer nozzle 604 and a coaxially mounted auxiliary gas nozzle 616, which may be affixed to the coolant sleeve instead of an auxiliary gas cap (such as auxiliary gas cap 134 in FIG. 1). In this example, the auxiliary gas flow 620 is widely "focused" to direct the auxiliary gas 620 in a broad area around melt pool 612. For example, the auxiliary gas 620 may strike the part being manufactured in broader circular pattern around melt pool 612. As above, the auxiliary gas flow 620 may be used to further shield the melt pool 612 or to actively cool the part being manufactured, or both. And here again, the rate and temperature of the auxiliary gas flow 620 may be controlled independently from the carrier gas flow through conical powder channel 608 and the shield gas flow through laser channel 614.

Notably, FIGS. 5 and 6 depict just two examples of auxiliary gas nozzles, but many other designs are possible. In general, an auxiliary gas nozzle may be designed to shape the auxiliary gas flow in a manner best fit for a particular application.

Figure 7:
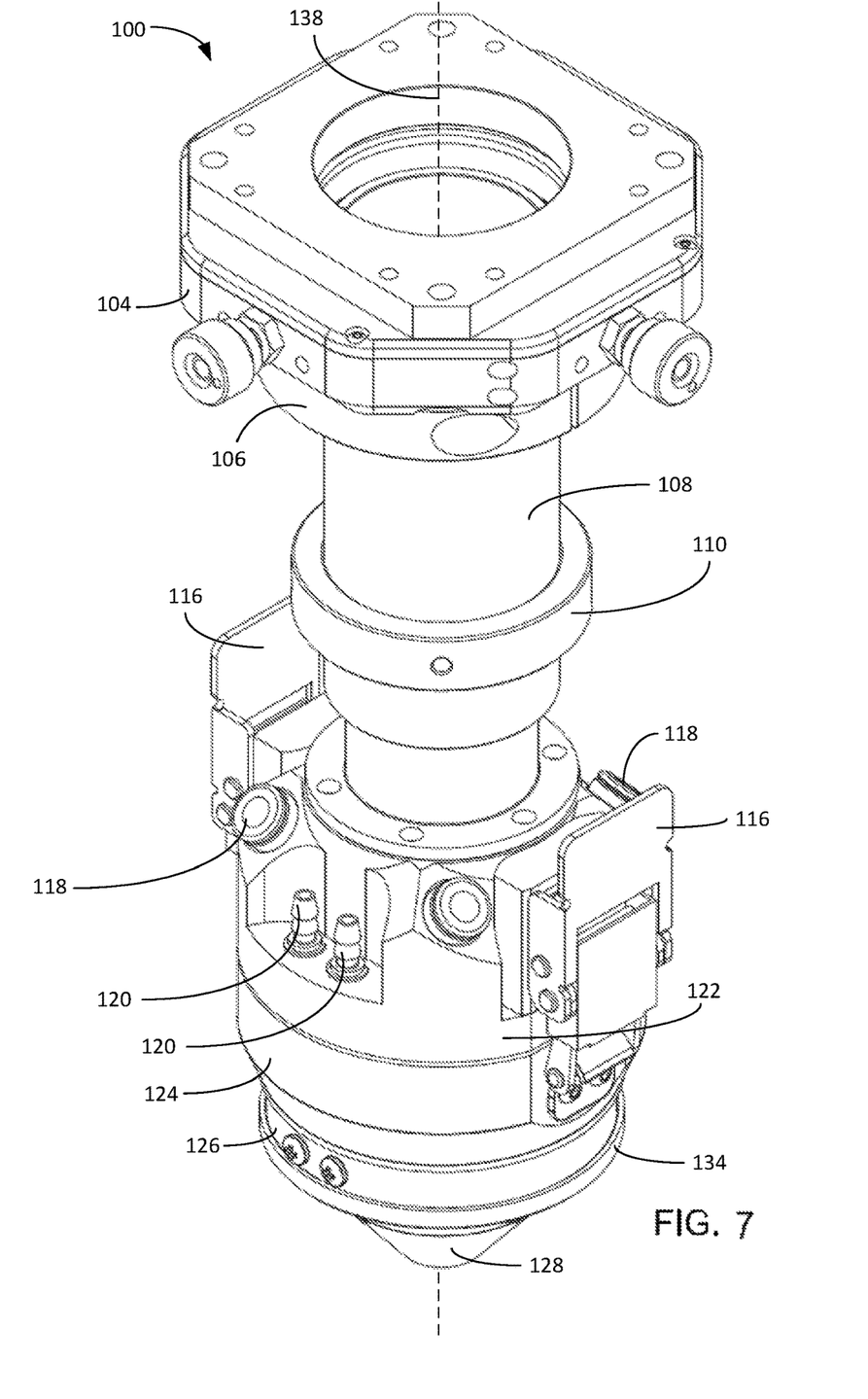
FIG. 7 depicts an isometric view of a laser metal deposition assembly.

FIG. 7 is an isometric view of LMD assembly 100, as depicted and described with respect to FIGS. 1-3.

Figure 8:
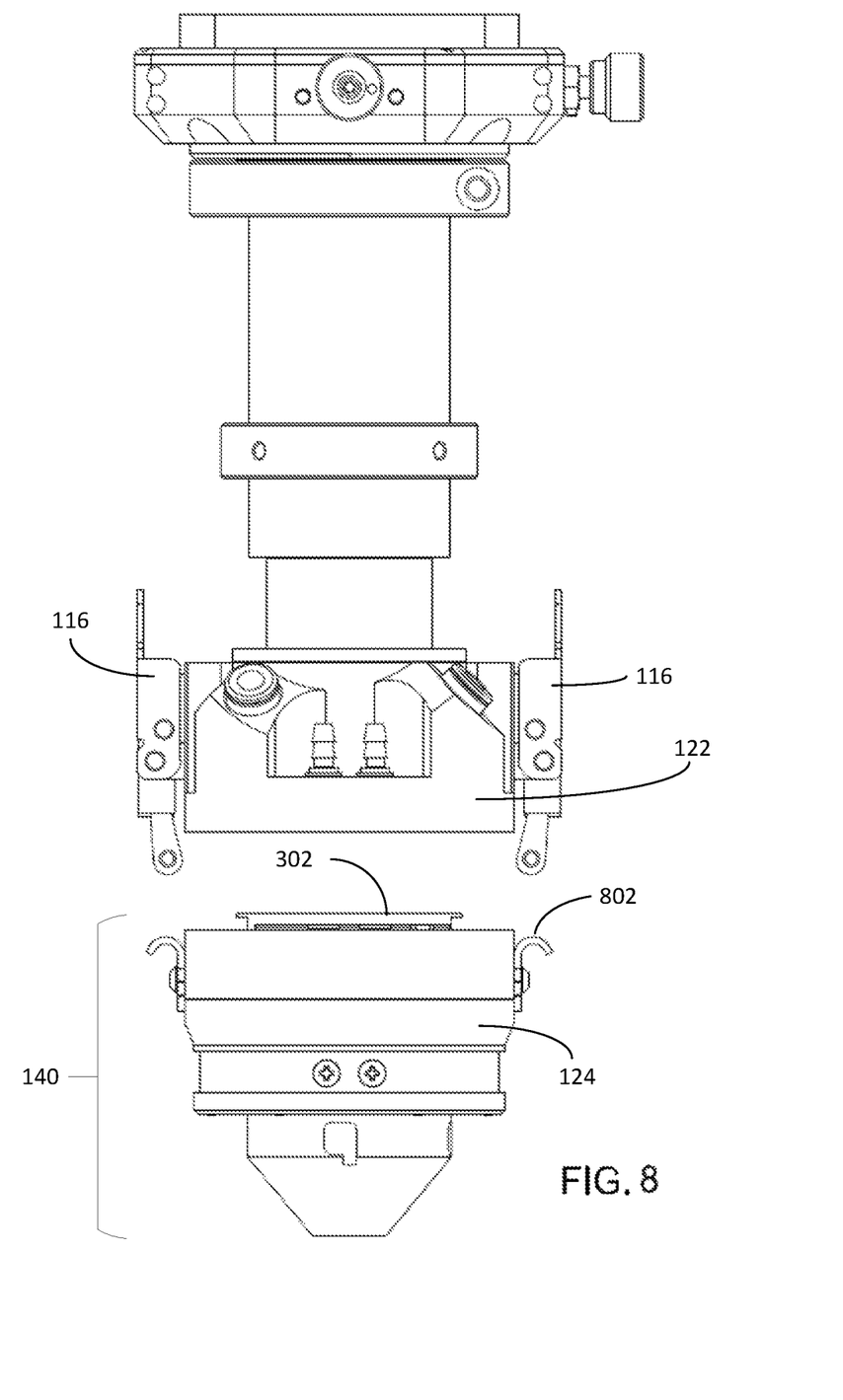
FIG. 8 depicts a view of a laser metal deposition assembly with a nozzle assembly separated from a main body.

FIG. 8 is a view of LMD assembly 100, as depicted and described with respect to FIGS. 1-3, with nozzle assembly 140 separated from main body 122. In this case, clamping mechanisms 116 have been released to, for example, service nozzle assembly 140 or to change nozzle assembly 140 for another modular nozzle assembly. Nozzle seat 124 includes clamp retainers 802, which interface with clamping mechanisms 116. Clamp retainers 802 may be different in other embodiments where clamping mechanisms 116 are of a different type (such as an electromechanical, pneumatic, hydraulic or magnetic mechanism).

FIG. 8 also depicts flow guide 302 seated within nozzle seat 124, as depicted in the cross-sectional view of FIG. 3.

Figure 9:
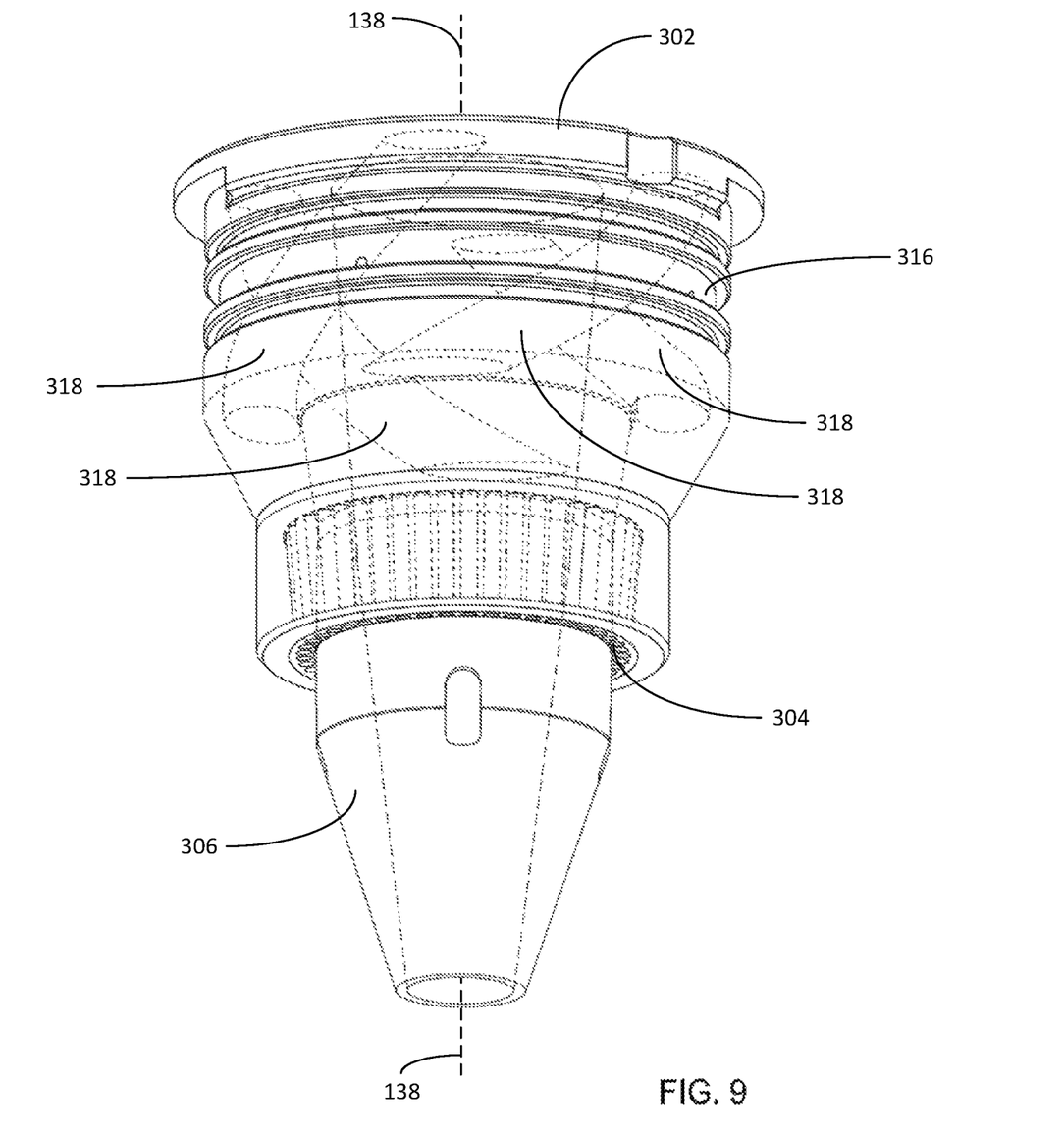
FIG. 9 depicts a view of aspects of a nozzle assembly.

FIG. 9 depicts a view of aspects of a nozzle assembly. Specifically, powder flow guide 302 is depicted connected with inner nozzle 306. In this embodiment, inner nozzle 306 is threaded into an internal diameter of flow guide 302. Helical powder flow channels 318 are depicted in broken lines within powder flow guide 302. Further, powder distribution channels are depicted. As in FIG. 3, here powder distribution channels 304 are at an angle of approximately 5 degrees relative to the primary/laser axis 138. In other examples, the powder distribution channels 304 may be set at any angle in the range +/−45 degrees with respect to the primary/laser axis 138. In some embodiments, the angle of powder distribution channels 304 could be larger, such as equal to the angle of inner nozzle's outer angled surface relative to the primary/laser axis 138.

Figure 10:
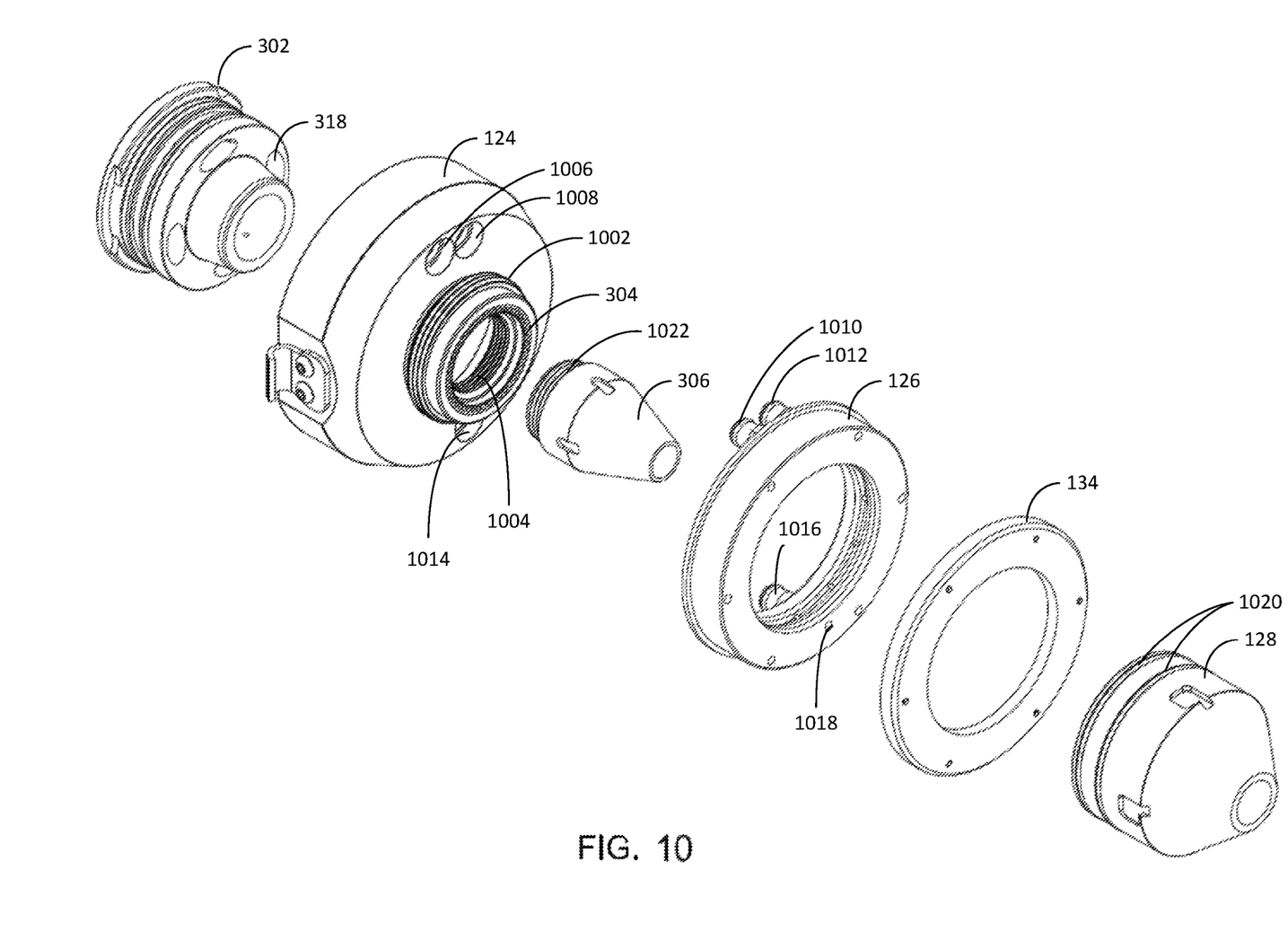
FIG. 10 depicts an exploded view of aspects of a nozzle assembly.

FIG. 10 depicts an exploded view of aspects of a nozzle assembly. Starting from one side, powder flow guide 302, which includes helical powder flow channels 318, seats within nozzle seat 124.

Nozzle seat 124 includes a threaded outer portion 1002 for engaging with a threaded inner portion (not visible in FIG. 10) of outer nozzle 128. Notably, a threaded connection between nozzle seat 124 and outer nozzle 128 is just one possible way of coupling the two elements, and others are possible. Nozzle seat 124 also includes a threaded inner portion 1004 for engaging with a threaded outer portion 1022 of inner nozzle 306. Here again, a threaded connection between nozzle seat 124 and inner nozzle 306 is just one possible way of coupling the two elements, and others are possible.

Nozzle seat 124 also includes powder distribution channels 304 as described above with respect to FIG. 3.

Nozzle seat 124 also includes coolant channels 1006 and 1008 of which one may serve as an inlet and one may serve as an outlet. Coolant channels 1006 and 1008 correspond with coolant connection ports 1010 and 1012 in coolant sleeve 126, and allow coolant flowing in from the main body of a nozzle assembly through nozzle seat 124 to reach coolant sleeve 126. Either of coolant connection ports 1010 and 1012 can act as a coolant entry port while the other acts as a coolant outlet port.

Nozzle seat 124 further includes auxiliary gas channel 1014, which corresponds with auxiliary gas port 1016 in coolant sleeve 126. Auxiliary gas port 1016 is in turn connected to auxiliary gas outlet 1018 via coolant sleeve 126. In some examples, coolant sleeve 126 may have a cooling effect on auxiliary gas as it flows through coolant sleeve 126.

In the example depicted in FIG. 10, the auxiliary gas outlet 1018 is blocked by auxiliary gas cap 134, as described with respect to FIG. 4. However, in other embodiments, such as described with FIGS. 5 and 6, auxiliary gas outlet 1018 may feed into a gas nozzle that directs the auxiliary gas around the processing area (e.g., around a melt pool).

Outer nozzle 128 includes O-ring channels 1020, which allow for sealing with coolant sleeve 126, as described above with respect to FIG. 3.

Figure 11:
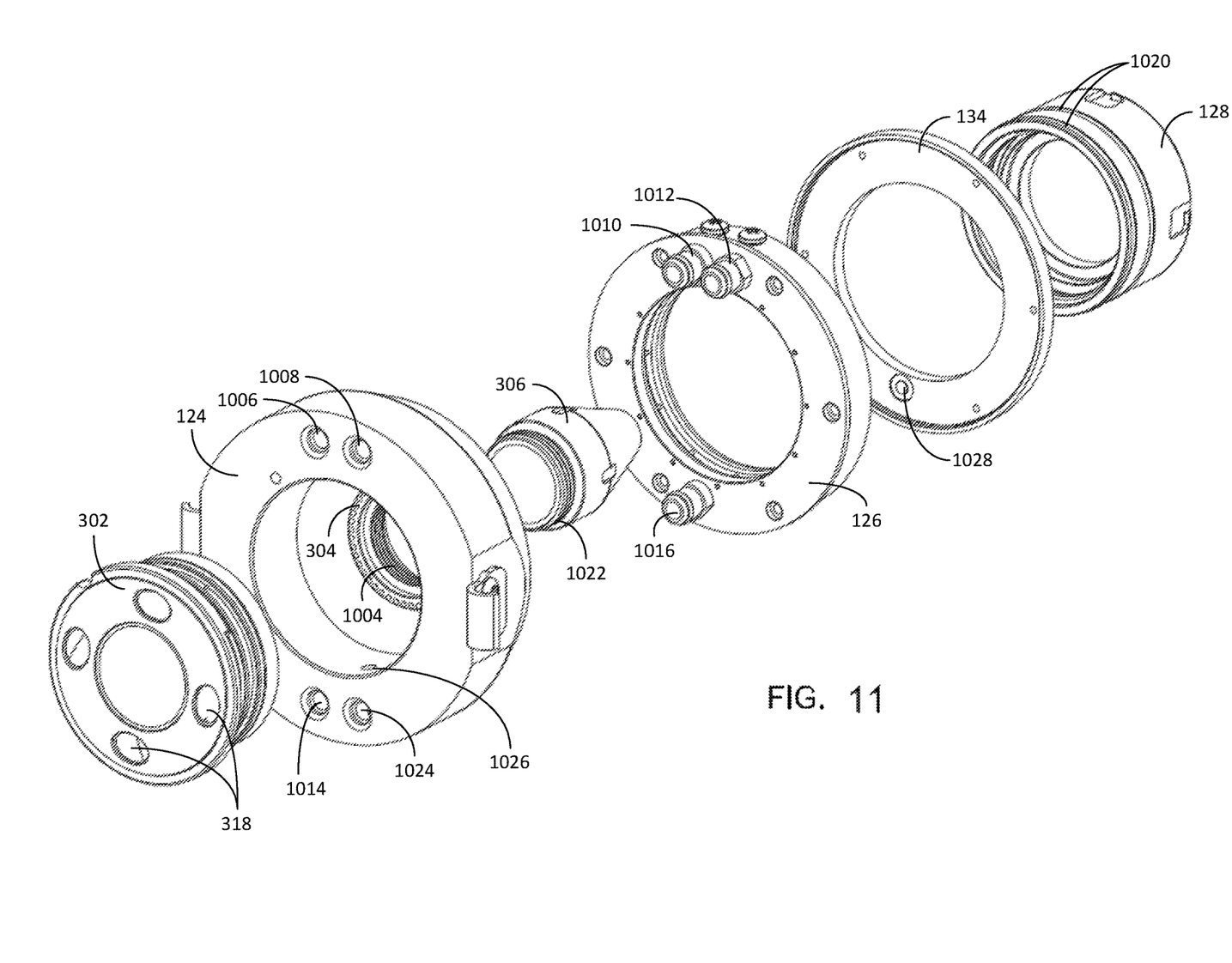
FIG. 11 depicts another exploded view of aspects of a nozzle assembly.

FIG. 11 depicts another exploded view of aspects of a nozzle assembly. Starting from one side, powder flow guide 302, which includes helical powder flow channels 318, seats within nozzle seat 124. Nozzle seat 124 also includes powder distribution channels 304 as described above with respect to FIG. 3.

As above, nozzle seat 124 includes coolant flow channels 1006 and 1008 of which one may serve as an inlet and one may serve as an outlet. Coolant flow channels 1006 and 1008 correspond with coolant connection ports 1010 and 1012 in coolant sleeve 126, and allow coolant flowing in from the main body of a nozzle assembly through nozzle seat 124 to reach coolant sleeve 126.

Nozzle seat further includes auxiliary gas channel 1014, which corresponds with auxiliary gas port 1016 in coolant sleeve 126. Auxiliary gas port 1016 is in turn connected to an auxiliary gas outlet (not visible in FIG. 11) via coolant sleeve 126. In the example depicted in FIG. 11, the auxiliary gas outlet is blocked by auxiliary gas cap 134, and in particular by an auxiliary gas seal 1028 in auxiliary gas cap 134. However, in other embodiments, such as described with FIGS. 5 and 6, the auxiliary gas outlet may feed into a gas cap that directs the auxiliary gas around the processing area (e.g., around a melt pool).

Nozzle seat 124 further includes shield gas channel 1024, which feeds shield gas into the laser channel via shield gas outlet 1026.

As above, outer nozzle 128 includes O-ring channels 1020, which allow for sealing with coolant sleeve 126, as described above with respect to FIG. 3.

Example Additive Manufacturing System

Figure 12:
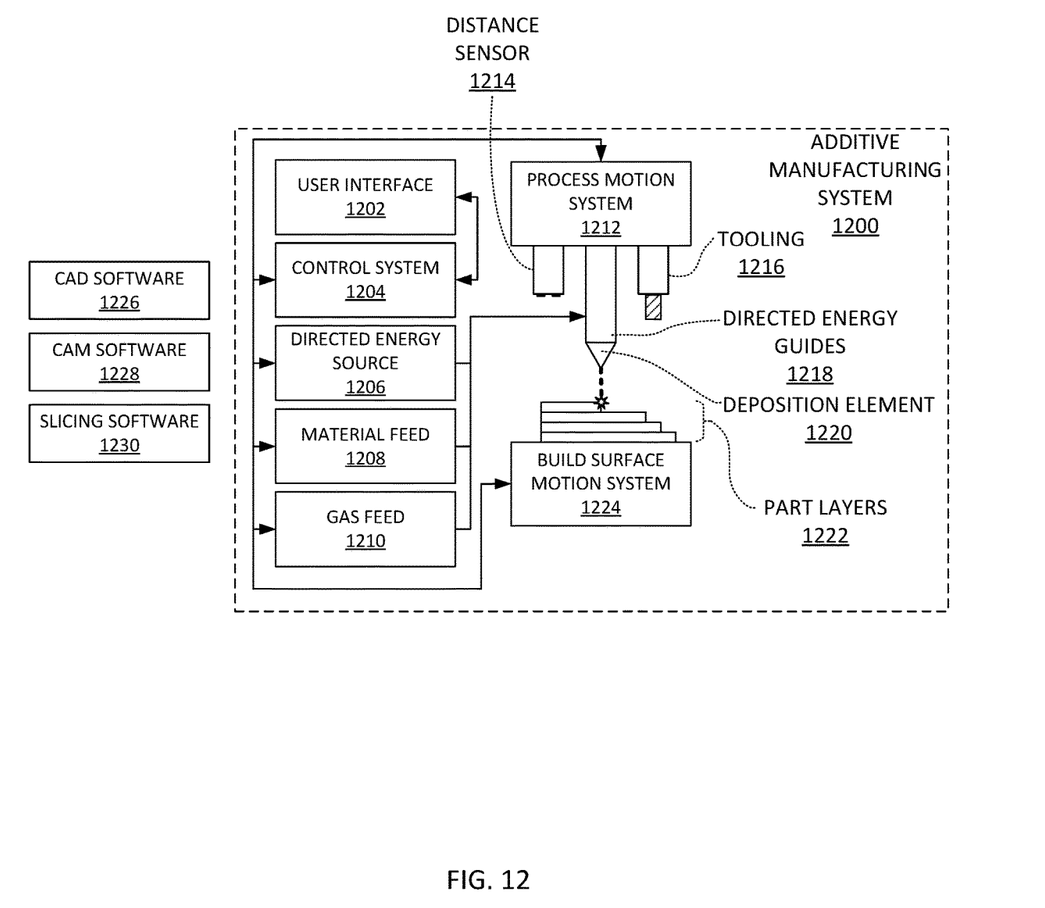
FIG. 12 depicts an example of an additive manufacturing system.

FIG. 12 depicts an example of an additive manufacturing system 1200. Additive manufacturing system 1200 includes a user interface 1202. User interface 1202 may be, for example, a graphical user interface comprising hardware and software controls for controlling additive manufacturing system 1200. In some examples, user interface 1202 may be integral with additive manufacturing system 1200 while in other examples user interface 1202 may be remote from additive manufacturing system 1200 (e.g., on a remote computer such as a laptop computer or a personal electronic device).

Additive manufacturing system 1200 also includes a control system 1204. In this example, control system 1204 is in data communication with user interface 1202 as well as directed energy source 1206, material feed 1208, gas feed 1210, distance sensor 1214, process motion system 1212, tooling 1216, and build surface motion system 1224. In other examples, control system 1204 may be in data communication with further elements of additive manufacturing system 1200.

Control system 1204 may include hardware and software for controlling various aspects of additive manufacturing system 1200. For example, control system 1204 may include one or more: processors, data storages, physical interfaces, software interfaces, software programs, firmwares, and other aspects in order to coordinate and control the various aspects of additive manufacturing system 1200. In some examples, control system 1204 may include network connectivity to various aspects of additive manufacturing system 1200 as well as to external networks, such as the Internet and other networks, such as local area networks (LANs) and wide area networks (WANs). In some examples, control system 1204 may be a purpose-built logic board, while in other examples control system 1204 may be implemented by a generic computer with specific software components for controlling the various aspects of additive manufacturing system 1200. The data connections shown between control system 1204 and other aspects of additive manufacturing system 1200 are exemplary only, and other implementations are possible.

Control system 1204 may interpret commands received from user interface 1202 and thereafter cause appropriate control signals to be transmitted to other aspects of additive manufacturing system 1200. For example, a user may input data representing a part to be manufactured using additive manufacturing system 1200 into user interface 1202 and control system 1204 may act upon that input to cause additive manufacturing system 1200 to manufacture the part.

In some examples, control system 1204 may compile and execute machine control codes, such as G-code data, that causes aspects of additive manufacturing machine 1200 to operate. For example, the machine control codes may cause process motion system 1212 or build surface motion system 1224 to move to specific positions and at specific speeds. As another example, the machine control codes may cause directed energy source 1206, material feed 1208, gas feed 1210, or tooling 1216 to activate or deactivate. Further, the machine control codes may modulate the operation of the aforementioned aspects of additive manufacturing machine 1200, such as by increasing or decreasing the power of directed energy source 1206, increasing or decreasing the flow rate of material feed 1208 or gas feed 1210, increasing or decreasing the speed of tooling 1216, etc.

Process motion system 1212 may move elements of additive manufacturing system 1200 to exact positions. For example, process motion system 1212 may position deposition element 1220 at an exact distance from a part layer 1222 being manufactured. Similarly, process motion system 1212 may position tooling 1216 precisely to perform fine tooling operations on a part layer 1222. Further, process motion system 1212 may position distance sensor 1214 precisely and provide a known reference location for distance measurements to one or more points on a part layer 1222. Process motion system 1212 may also report current positioning of elements of additive manufacturing system 1200 to control system 1204 for use in providing feedback during the additive manufacturing process.

Directed energy source 1206 may provide any suitable form of directed energy, such as a laser beam (e.g., from a fiber laser) or an electron beam generator, which is capable of melting a manufacturing material, such as a metal powder. Directed energy source 1206 may interact with directed energy guides 1218 in order to, for example, direct or focus a particular type of directed energy. For example, directed energy guides 1218 may comprise one or more optical elements, such as mirrors, lenses, filters, and the like, configured to focus a laser beam at a specific focal point and to control the size of the focused laser point. In this way, the actual creation of the laser energy by directed energy source 1206 may be located remote from the manipulation and focus of the laser energy by directed energy guides 1218.

Directed energy source 1206 may also be used to remove material from a manufactured part, such as by ablation.

Material feed 1208 may supply building material, such as a powder, to deposition element 1220. In some examples, material feed 1208 may be a remote reservoir including one or more types of raw material (e.g., different types of metal) to be used by additive manufacturing system 1200.

Deposition element 1220 may be connected with material feed 1208 and may direct material, such as powder, towards a focal point of directed energy source 1206. In this way, deposition element 1220 may control the amount of material that is additively manufactured at a particular point in time. Deposition element may include nozzles, apertures, and other features for directing material, such as metal powder, towards a manufacturing surface, such as a build surface or previously deposited material layer. In some examples, deposition element 1220 may have controllable characteristics, such as controllable nozzle aperture sizes. In some examples, deposition element 1220 may be a nozzle assembly or deposition head of a laser metal deposition machine.

Gas feed 1210 may be connected with deposition element 1220 to provide propulsive force to the material provided by material feed 1208. In some examples, gas feed 1210 may modulate the gas flow rate to control material (e.g., powder) flow through deposition element 1220 and/or to provide cooling effect during the manufacturing process.

Distance sensor 1214 may be any sort of sensor capable of measuring distance to an object. In some examples, distance sensor 1214 may be an optical distance sensor, such as a laser distance sensor. In other examples, distance sensor 1214 may be an acoustic distance sensor, such as an ultrasonic sensor. In yet other examples, distance sensor 1214 may be an electromagnetic distance sensor or a contact-based distance sensor.

Tooling 1216 may be any form of machine tool, such as a tool for cutting, grinding, milling, lathing, etc. In the example depicted in FIG. 12, Tooling 1216 may be moved into place by process motion system 1212. In other examples, tooling 1216 may be separate from, for example, deposition element 1220 and distance sensor 1214 but likewise controllable by control system 1204.

Notably, while directed energy source 1206, material feed 1208, gas feed 1210, directed energy guides 1218, distance sensor 1214, tooling 1216, and deposition element 1220 are shown in an example configuration in FIG. 12, other configurations are possible.

Process motion system 1212 may control the positioning of one or more aspects of additive manufacturing system 1200, such as distance sensor 1214, deposition element 1220, and tooling 1216. In some examples, process motion system 1212 may be movable in one or more degrees of freedom. For example, process motion system 1212 may move and rotate deposition element 1220, distance sensor 1214, and tooling 1216 in and about the X, Y, and Z axes during the manufacturing of part layers 1222.

Build surface motion system 1224 may control the positioning of, for example, a build surface upon which part layers 1222 are manufactured. In some examples, build surface motion system 1224 may be movable in one or more degrees of freedom. For example, build surface motion system 1224 may move and rotate the build surface in and about the X, Y, and Z axes during the manufacturing of part layers 1222. In some examples, the build surface may be referred to as a build plate or build substrate.

Computer-Aided Design (CAD) software 1226 may be used to design a digital representation of a part to be manufactured, such as a 3D model. CAD software 1226 may be used to create 3D design models in standard data formats, such as DXF, STP, IGS, STL, and others. While shown separate from additive manufacturing system 1200 in FIG. 12, in some examples CAD software 1226 may be integrated with additive manufacturing system 1200.

Slicing software 1230 may be used to "slice" a 3D design model into a plurality of slices or design layers. Such slices or design layers may be used for the layer-by-layer additive manufacturing of parts using, for example, additive manufacturing system 1200.

Computer-Aided Manufacturing (CAM) software 1228 may control machinery, such as machine tools, for use in manufacturing parts. CAM software 1228 may be used to create machine control codes, for example, G-Code or LAMPS codes as described further below, for the control of machine tools, such as tooling 1216, or deposition tools, such as deposition element 1220. For example, CAM software may create code in order to direct a manufacturing system, such as additive manufacturing system 1200, to deposit a material layer along a 2D plane, such as a build surface, in order to build a part. For example, as shown in FIG. 12, part layers 1222 are manufactured on (e.g., deposited on, formed on, etc.) build surface motion system 1224 using process motion system 1212 and deposition element 1220.

In some examples, one or more of CAD software 1226, CAM software 1228, and Slicing Software 1230 may be combined into a single piece or suite of software. For example, CAD or CAM software may have an integrated slicing function.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A laser metal deposition assembly, comprising:
   a main body, comprising:
      a plurality of powder inlets, each inlet disposed at a first angle relative to a primary axis of the laser metal deposition assembly;
      a coolant inlet;
      a coolant outlet;
      a shield gas inlet; and
      a clamp;
   a nozzle seat, comprising:
      a threaded outer portion configured for receiving an outer nozzle disposed on a first side of the nozzle seat;
      a threaded inner portion configured for receiving an inner nozzle disposed on the first side of the nozzle seat;
      a coolant inlet channel;
      a coolant outlet channel;
      a shield gas channel;
      a plurality of powder distribution channels; and
      a clamp retainer, wherein the clamp retainer and the clamp are operable to fix together the main body and the nozzle seat;
   an inner nozzle connected to the threaded inner portion of the nozzle seat;
   an outer nozzle connected to the outer threaded portion of the nozzle seat, wherein the outer nozzle and inner nozzle form a conical powder outlet channel therebetween;

a powder flow guide disposed within a second side of the nozzle seat, opposite the first side of the nozzle seat; and a coolant sleeve comprising:
  a coolant entry port;
  a coolant outlet port; and
  an inner surface in contact with an outer surface of the outer nozzle.

2. The laser metal deposition assembly of claim 1, wherein the powder flow guide comprises a plurality of helical powder flow channels.

3. The laser metal deposition assembly of claim 2, wherein the plurality of powder distribution channels are disposed at a second angle relative to the primary axis.

4. The laser metal deposition assembly of claim 3, wherein:
  the main body further comprises an auxiliary gas inlet;
  the nozzle seat further comprises a first auxiliary gas channel; and
  the coolant sleeve further comprises an auxiliary gas port and an auxiliary gas outlet.

5. The laser metal deposition assembly of claim 4, further comprising an auxiliary gas cap connected to the coolant sleeve.

6. The laser metal deposition assembly of claim 5, wherein the auxiliary gas cap further comprises an auxiliary gas seal configured to seal the auxiliary gas outlet in the coolant sleeve.

7. The laser metal deposition assembly of claim 4, further comprising:
  an auxiliary gas nozzle fixed to the coolant sleeve,
  wherein the auxiliary gas nozzle forms a second auxiliary gas channel between the auxiliary gas nozzle and the outer nozzle.

8. The laser metal deposition assembly of claim 4, wherein the powder flow guide and the nozzle seat are arranged to form a powder mixing chamber therebetween.

9. The laser metal deposition assembly of claim 2, wherein:
  the main body further comprises a plurality of powder flow channels, and
  each of the plurality of helical powder flow channels in the powder flow guide comprises an end aligned with a powder flow channel of the plurality of powder flow channels in the main body.

10. The laser metal deposition assembly of claim 1, wherein the first angle is in a range of 15-50 degrees.

11. The laser metal deposition assembly of claim 1, wherein the plurality of powder inlets are positioned within a lateral extent of the main body.

12. The laser metal deposition assembly of claim 1, wherein the coolant inlet and the coolant outlet are positioned within a lateral extent of the main body.

13. The laser metal deposition assembly of claim 1, wherein the shield gas inlet is positioned within a lateral extent of the main body.

14. The laser metal deposition assembly of claim 1, wherein the first angle is an acute angle with respect to the primary axis.

15. The laser metal deposition assembly of claim 1, wherein the plurality of powder inlets comprises four powder inlets.

16. The laser metal deposition assembly of claim 1, wherein the inner nozzle and the outer nozzle comprise a copper-based alloy.

17. The laser metal deposition assembly of claim 1, wherein the inner nozzle and the outer nozzle comprise an aluminum-based alloy.

18. The laser metal deposition assembly of claim 1, further comprising:
  an extension tube connected to the main body; and
  an axial hard stop attached to the extension tube.

19. The laser metal deposition assembly of claim 18, further comprising: an axial adjustment clamp configured to connect the extension tube to a laser metal deposition assembly positioning system.

20. The laser metal deposition assembly of claim 19, wherein the laser metal deposition assembly positioning system comprises an X-Y adjustment stage connected to the extension tube.

* * * * *